United States Patent
Kruzeniski et al.

(10) Patent No.: US 9,218,067 B2
(45) Date of Patent: Dec. 22, 2015

(54) MOBILE COMMUNICATIONS DEVICE USER INTERFACE

(75) Inventors: Michael J. Kruzeniski, Seattle, WA (US); Michael A. Smuga, Seattle, WA (US); Michael K. Henderlight, Sammamish, WA (US); Brian M. Wilson, Mercer Island, WA (US); Chad Aron Voss, Seattle, WA (US); Paula Guntaur, Seattle, WA (US); Jonathan D. Friedman, Seattle, WA (US); Patrick S. Corrigan, San Francisco, CA (US); Dustin Owen Williams, Little Rock, AR (US); Joseph P. McLaughlin, Seattle, WA (US); Ryan T. Murphy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 12/560,081

(22) Filed: Sep. 15, 2009

(65) Prior Publication Data

US 2010/0180233 A1    Jul. 15, 2010

Related U.S. Application Data

(60) Provisional application No. 61/107,945, filed on Oct. 23, 2008, provisional application No. 61/107,935, filed on Oct. 23, 2008, provisional application No. 61/107,921, filed on Oct. 23, 2008.

(51) Int. Cl.
*G06F 3/048* (2013.01)
*G06F 3/02* (2006.01)
(Continued)

(52) U.S. Cl.
CPC ............ *G06F 3/0219* (2013.01); *G06F 3/0227* (2013.01); *G06F 3/0236* (2013.01);
(Continued)

(58) Field of Classification Search
CPC ..................................... G06F 3/0482
USPC .......................................... 715/834
See application file for complete search history.

(56) References Cited

U.S. PATENT DOCUMENTS

| 5,189,732 A | 2/1993 | Kondo |
|---|---|---|
| 5,258,748 A | 11/1993 | Jones |

(Continued)

FOREIGN PATENT DOCUMENTS

| CA | 2363978 | 5/2003 |
|---|---|---|
| CN | 1749936 | 3/2006 |

(Continued)

OTHER PUBLICATIONS http://www.echoecho.com/toolfloatinglayer.htm published Oct. 25, 2001.*

(Continued)

*Primary Examiner* — Angie Badawi
(74) *Attorney, Agent, or Firm* — Bryan Webster; Judy Yee; Micky Minhas

(57) ABSTRACT

A mobile communications device user interface is described. In an implementation, a method is implemented by a computing device that includes displaying content in conjunction with a first level of a hierarchical menu in a user interface on a display device of the computing device. Responsive to receipt of an input to navigate to a second level of the hierarchical menu that is a sublevel of the first level, the second level in displayed conjunction with the content on the display device, the content having a reduced display richness when displayed in conjunction with the second level than when displayed in conjunction with the first level.

20 Claims, 7 Drawing Sheets

(51) Int. Cl.

| | | |
|---|---|---|
| *G06F 3/0482* | (2013.01) | |
| *G06F 3/0488* | (2013.01) | |
| *G06F 17/30* | (2006.01) | |
| *G06Q 30/04* | (2012.01) | |
| *G06Q 30/06* | (2012.01) | |
| *H04M 1/725* | (2006.01) | |
| *G06F 3/041* | (2006.01) | |
| *G06F 3/0485* | (2013.01) | |
| *G06F 3/023* | (2006.01) | |
| *G06F 3/044* | (2006.01) | |
| *H04W 4/02* | (2009.01) | |
| *H04W 8/24* | (2009.01) | |
| *H04W 64/00* | (2009.01) | |
| *H04W 72/04* | (2009.01) | |

(52) U.S. Cl.
CPC .............. *G06F 3/041* (2013.01); *G06F 3/044* (2013.01); *G06F 3/0412* (2013.01); *G06F 3/0482* (2013.01); *G06F 3/0485* (2013.01); *G06F 3/0488* (2013.01); *G06F 3/04883* (2013.01); *G06F 17/30864* (2013.01); *G06F 17/30867* (2013.01); *G06Q 30/04* (2013.01); *G06Q 30/0601* (2013.01); *H04M 1/7258* (2013.01); *H04M 1/72569* (2013.01); *H04M 1/72583* (2013.01); *G06F 3/0202* (2013.01); *G06F 2203/04807* (2013.01); *H04W 4/02* (2013.01); *H04W 8/245* (2013.01); *H04W 64/00* (2013.01); *H04W 72/04* (2013.01)

(56) References Cited

U.S. PATENT DOCUMENTS

| | | | |
|---|---|---|---|
| 5,404,442 | A | 4/1995 | Foster et al. |
| 5,463,725 | A | 10/1995 | Henckel et al. |
| 5,515,495 | A | 5/1996 | Ikemoto |
| 5,574,836 | A | 11/1996 | Broemmelsiek |
| 5,675,329 | A | 10/1997 | Barker |
| 5,754,178 | A | 5/1998 | Johnston, Jr. et al. |
| 5,860,073 | A | 1/1999 | Ferrel et al. |
| 5,905,492 | A | 5/1999 | Straub et al. |
| 5,914,720 | A | 6/1999 | Maples et al. |
| 5,963,204 | A | 10/1999 | Ikeda et al. |
| 6,008,816 | A | 12/1999 | Eisler |
| 6,184,879 | B1 | 2/2001 | Minemura et al. |
| 6,317,142 | B1 | 11/2001 | Decoste et al. |
| 6,385,630 | B1 | 5/2002 | Ejerhed |
| 6,396,963 | B2 | 5/2002 | Shaffer |
| 6,424,338 | B1 | 7/2002 | Anderson |
| 6,507,643 | B1 | 1/2003 | Groner |
| 6,570,582 | B1 | 5/2003 | Sciammarella et al. |
| 6,642,944 | B2 | 11/2003 | Conrad et al. |
| 6,662,023 | B1 | 12/2003 | Helle |
| 6,697,825 | B1 | 2/2004 | Underwood et al. |
| 6,784,925 | B1 | 8/2004 | Tomat |
| 6,865,297 | B2 | 3/2005 | Loui |
| 6,876,312 | B2 | 4/2005 | Yu |
| 6,904,597 | B2 | 6/2005 | Jin |
| 6,961,731 | B2 | 11/2005 | Holbrook |
| 6,983,310 | B2 | 1/2006 | Rouse |
| 6,987,991 | B2 | 1/2006 | Nelson |
| 7,007,238 | B2 | 2/2006 | Glaser |
| 7,013,041 | B2 | 3/2006 | Miyamoto |
| 7,058,955 | B2 | 6/2006 | Porkka |
| 7,065,385 | B2 | 6/2006 | Jarrad et al. |
| 7,065,386 | B1 | 6/2006 | Smethers |
| 7,111,044 | B2 | 9/2006 | Lee |
| 7,133,707 | B1 | 11/2006 | Rak |
| 7,133,859 | B1 | 11/2006 | Wong |
| 7,139,800 | B2 | 11/2006 | Bellotti et al. |
| 7,158,123 | B2 | 1/2007 | Myers |
| 7,178,111 | B2 | 2/2007 | Glein et al. |
| 7,197,702 | B2 | 3/2007 | Niyogi et al. |
| 7,213,079 | B2 | 5/2007 | Narin |
| 7,216,588 | B2 | 5/2007 | Suess |
| 7,249,326 | B2 | 7/2007 | Stoakley et al. |
| 7,280,097 | B2 | 10/2007 | Chen |
| 7,283,620 | B2 | 10/2007 | Adamczyk |
| 7,289,806 | B2 | 10/2007 | Morris et al. |
| 7,296,184 | B2 | 11/2007 | Derks et al. |
| 7,336,263 | B2 | 2/2008 | Valikangas |
| 7,369,647 | B2 | 5/2008 | Gao et al. |
| 7,388,578 | B2 | 6/2008 | Tao |
| 7,403,191 | B2 | 7/2008 | Sinclair |
| 7,447,520 | B2 | 11/2008 | Scott |
| 7,461,151 | B2 | 12/2008 | Colson et al. |
| 7,469,381 | B2 | 12/2008 | Ording |
| 7,479,949 | B2 | 1/2009 | Jobs |
| 7,480,870 | B2 | 1/2009 | Anzures |
| 7,483,418 | B2 | 1/2009 | Maurer |
| 7,496,830 | B2 | 2/2009 | Rubin |
| 7,593,995 | B1 | 9/2009 | He et al. |
| 7,606,714 | B2 | 10/2009 | Williams et al. |
| 7,610,563 | B2 | 10/2009 | Nelson et al. |
| 7,614,018 | B1 | 11/2009 | Ohazama et al. |
| 7,619,615 | B1 | 11/2009 | Donoghue |
| 7,640,518 | B2 | 12/2009 | Forlines et al. |
| 7,657,849 | B2 | 2/2010 | Chaudhri et al. |
| 7,671,756 | B2 | 3/2010 | Herz et al. |
| 7,681,138 | B2 | 3/2010 | Grasser et al. |
| 7,702,683 | B1 | 4/2010 | Kirshenbaum |
| 7,730,425 | B2 | 6/2010 | de los Reyes et al. |
| 7,746,388 | B2 | 6/2010 | Jeon |
| 7,755,674 | B2 | 7/2010 | Kaminaga |
| 7,782,332 | B2 | 8/2010 | Nagata |
| 7,782,339 | B1 | 8/2010 | Hobbs et al. |
| 7,792,876 | B2 | 9/2010 | Easwar |
| 7,834,861 | B2 | 11/2010 | Lee |
| 7,877,707 | B2 | 1/2011 | Westerman et al. |
| 7,889,180 | B2 | 2/2011 | Byun et al. |
| 7,903,115 | B2 | 3/2011 | Platzer et al. |
| 7,983,718 | B1 | 7/2011 | Roka |
| 8,006,276 | B2 | 8/2011 | Nakagawa et al. |
| 8,074,174 | B2 | 12/2011 | Suzuki et al. |
| 8,086,275 | B2 | 12/2011 | Wykes |
| 8,127,254 | B2 | 2/2012 | Lindberg et al. |
| 8,130,226 | B2 | 3/2012 | Brunner et al. |
| 8,131,808 | B2 | 3/2012 | Aoki et al. |
| 8,150,924 | B2 | 4/2012 | Buchheit et al. |
| 8,175,653 | B2 | 5/2012 | Smuga |
| 8,200,779 | B2 | 6/2012 | Wei et al. |
| 8,238,526 | B1 | 8/2012 | Seth et al. |
| 8,238,876 | B2 | 8/2012 | Teng |
| 8,250,494 | B2 | 8/2012 | Butcher |
| 8,255,473 | B2 | 8/2012 | Eren et al. |
| 8,266,550 | B1 | 9/2012 | Cleron et al. |
| 8,269,736 | B2 | 9/2012 | Wilairat |
| 8,280,901 | B2 | 10/2012 | McDonald |
| 8,289,688 | B2 | 10/2012 | Behar et al. |
| 8,294,715 | B2 | 10/2012 | Patel et al. |
| 8,299,943 | B2 | 10/2012 | Longe |
| 8,355,698 | B2 | 1/2013 | Teng et al. |
| 8,385,952 | B2 | 2/2013 | Friedman et al. |
| 8,411,046 | B2 | 4/2013 | Kruzeniski et al. |
| 8,448,083 | B1 | 5/2013 | Migos et al. |
| 8,548,431 | B2 | 10/2013 | Teng et al. |
| 8,564,461 | B2 | 10/2013 | Rubanovich et al. |
| 8,634,876 | B2 | 1/2014 | Friedman |
| 8,781,533 | B2 | 7/2014 | Wykes et al. |
| 8,892,170 | B2 | 11/2014 | Teng et al. |
| 8,914,072 | B2 | 12/2014 | Smuga et al. |
| 8,970,499 | B2 | 3/2015 | Wykes et al. |
| 2001/0015721 | A1 | 8/2001 | Byun et al. |
| 2001/0022621 | A1 | 9/2001 | Squibbs |
| 2002/0000963 | A1 | 1/2002 | Yoshida et al. |
| 2002/0018051 | A1 | 2/2002 | Singh |
| 2002/0026349 | A1 | 2/2002 | Reilly et al. |
| 2002/0035607 | A1 | 3/2002 | Checkoway |
| 2002/0060701 | A1 | 5/2002 | Naughton et al. |
| 2002/0070961 | A1 | 6/2002 | Xu et al. |
| 2002/0091755 | A1 | 7/2002 | Narin |
| 2002/0128036 | A1 | 9/2002 | Yach et al. |

(56) References Cited

U.S. PATENT DOCUMENTS

| | | |
|---|---|---|
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0154176 A1* | 10/2002 | Barksdale et al. ............ 345/853 |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0040300 A1 | 2/2003 | Bodic |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0234799 A1 | 12/2003 | Lee |
| 2004/0015553 A1 | 1/2004 | Griffin et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0137884 A1 | 7/2004 | Engstrom et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0250217 A1 | 12/2004 | Tojo et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0114788 A1 | 5/2005 | Fabritius |
| 2005/0143138 A1 | 6/2005 | Lee et al. |
| 2005/0179654 A1 | 8/2005 | Hawkins |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0216300 A1 | 9/2005 | Appelman et al. |
| 2005/0223057 A1 | 10/2005 | Buchheit et al. |
| 2005/0232166 A1 | 10/2005 | Nierhaus |
| 2005/0250547 A1 | 11/2005 | Salman et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0005207 A1 | 1/2006 | Louch et al. |
| 2006/0015736 A1 | 1/2006 | Callas et al. |
| 2006/0015812 A1 | 1/2006 | Cunningham |
| 2006/0025220 A1 | 2/2006 | Macauley et al. |
| 2006/0026013 A1 | 2/2006 | Kraft |
| 2006/0059430 A1 | 3/2006 | Bells |
| 2006/0070005 A1 | 3/2006 | Gilbert et al. |
| 2006/0070007 A1 | 3/2006 | Cummins et al. |
| 2006/0074771 A1 | 4/2006 | Kim |
| 2006/0103623 A1 | 5/2006 | Davis |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0199598 A1 | 9/2006 | Lee et al. |
| 2006/0206590 A1 | 9/2006 | Wakasa et al. |
| 2006/0218234 A1 | 9/2006 | Deng et al. |
| 2006/0246955 A1 | 11/2006 | Nirhamo |
| 2006/0253801 A1* | 11/2006 | Okaro et al. ................ 715/810 |
| 2006/0259870 A1 | 11/2006 | Hewitt et al. |
| 2006/0259873 A1 | 11/2006 | Mister |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294396 A1 | 12/2006 | Witman |
| 2007/0005716 A1 | 1/2007 | LeVasseur et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0050337 A1 | 3/2007 | Venkataraman et al. |
| 2007/0054679 A1 | 3/2007 | Cho et al. |
| 2007/0061306 A1 | 3/2007 | Pell et al. |
| 2007/0061714 A1 | 3/2007 | Stuple et al. |
| 2007/0067272 A1 | 3/2007 | Flynt |
| 2007/0073718 A1 | 3/2007 | Ramer |
| 2007/0076013 A1 | 4/2007 | Campbell |
| 2007/0079249 A1 | 4/2007 | Pall et al. |
| 2007/0080954 A1 | 4/2007 | Griffin |
| 2007/0082707 A1 | 4/2007 | Flynt et al. |
| 2007/0082708 A1 | 4/2007 | Griffin |
| 2007/0106635 A1 | 5/2007 | Frieden et al. |
| 2007/0118801 A1 | 5/2007 | Harshbarger et al. |
| 2007/0127638 A1 | 6/2007 | Doulton |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0162850 A1 | 7/2007 | Adler et al. |
| 2007/0171192 A1 | 7/2007 | Seo et al. |
| 2007/0171238 A1 | 7/2007 | Ubillos et al. |
| 2007/0182595 A1 | 8/2007 | Ghasabian |
| 2007/0185847 A1 | 8/2007 | Budzik et al. |
| 2007/0192707 A1 | 8/2007 | Maeda et al. |
| 2007/0192708 A1 | 8/2007 | Lee et al. |
| 2007/0198420 A1 | 8/2007 | Goldstein |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0216651 A1 | 9/2007 | Patel |
| 2007/0225022 A1 | 9/2007 | Satake |
| 2007/0232342 A1 | 10/2007 | Larocca |
| 2007/0233654 A1 | 10/2007 | Karlson |
| 2007/0238488 A1 | 10/2007 | Scott |
| 2007/0247435 A1 | 10/2007 | Benko et al. |
| 2007/0250583 A1 | 10/2007 | Hardy |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0009272 A1 | 1/2008 | Toledano |
| 2008/0032681 A1 | 2/2008 | West |
| 2008/0036743 A1 | 2/2008 | Westerman |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0066010 A1 | 3/2008 | Brodersen et al. |
| 2008/0068447 A1 | 3/2008 | Mattila et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092057 A1 | 4/2008 | Monson et al. |
| 2008/0094370 A1 | 4/2008 | Ording et al. |
| 2008/0102863 A1 | 5/2008 | Hardy |
| 2008/0114535 A1* | 5/2008 | Nesbitt .................... 701/202 |
| 2008/0120457 A1 | 5/2008 | Chang et al. |
| 2008/0132252 A1 | 6/2008 | Altman et al. |
| 2008/0153551 A1 | 6/2008 | Baek et al. |
| 2008/0155425 A1 | 6/2008 | Murthy et al. |
| 2008/0155437 A1 | 6/2008 | Morris |
| 2008/0162651 A1 | 7/2008 | Madnani |
| 2008/0165132 A1 | 7/2008 | Weiss |
| 2008/0165136 A1 | 7/2008 | Christie et al. |
| 2008/0165163 A1 | 7/2008 | Bathiche |
| 2008/0167058 A1 | 7/2008 | Lee et al. |
| 2008/0168290 A1 | 7/2008 | Jobs et al. |
| 2008/0168403 A1 | 7/2008 | Westerman et al. |
| 2008/0172609 A1 | 7/2008 | Rytivaara |

(56) References Cited

U.S. PATENT DOCUMENTS

| | | |
|---|---|---|
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189658 A1 | 8/2008 | Jeong et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0215980 A1 | 9/2008 | Lee et al. |
| 2008/0222560 A1 | 9/2008 | Harrison |
| 2008/0222569 A1 | 9/2008 | Champion |
| 2008/0242362 A1 | 10/2008 | Duarte |
| 2008/0250035 A1 | 10/2008 | Smith et al. |
| 2008/0259042 A1 | 10/2008 | Thorn |
| 2008/0261660 A1 | 10/2008 | Huh et al. |
| 2008/0263457 A1 | 10/2008 | Kim et al. |
| 2008/0270558 A1 | 10/2008 | Ma |
| 2008/0295017 A1 | 11/2008 | Tseng et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307364 A1 | 12/2008 | Chaudhri et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2009/0002332 A1 | 1/2009 | Park et al. |
| 2009/0007017 A1 | 1/2009 | Anzures et al. |
| 2009/0012952 A1 | 1/2009 | Fredriksson |
| 2009/0019369 A1 | 1/2009 | Borovsky et al. |
| 2009/0029736 A1 | 1/2009 | Kim et al. |
| 2009/0037413 A1 | 2/2009 | Castell et al. |
| 2009/0037469 A1 | 2/2009 | Kirsch |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070695 A1 | 3/2009 | Oh et al. |
| 2009/0077649 A1 | 3/2009 | Lockhart |
| 2009/0083656 A1 | 3/2009 | Dukhon |
| 2009/0083850 A1 | 3/2009 | Fadell et al. |
| 2009/0085851 A1 | 4/2009 | Lim |
| 2009/0085878 A1 | 4/2009 | Heubel |
| 2009/0089215 A1 | 4/2009 | Newton |
| 2009/0106694 A1 | 4/2009 | Kraft et al. |
| 2009/0109184 A1 | 4/2009 | Kim et al. |
| 2009/0109243 A1 | 4/2009 | Kraft |
| 2009/0111447 A1 | 4/2009 | Nurmi |
| 2009/0117942 A1 | 5/2009 | Boningue et al. |
| 2009/0119606 A1 | 5/2009 | Gilbert |
| 2009/0140061 A1 | 6/2009 | Schultz et al. |
| 2009/0140986 A1 | 6/2009 | Karkkainen et al. |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0170480 A1 | 7/2009 | Lee |
| 2009/0205041 A1 | 8/2009 | Michalske |
| 2009/0228825 A1 | 9/2009 | Van Os et al. |
| 2009/0259971 A1 | 10/2009 | Rankine et al. |
| 2009/0265662 A1 | 10/2009 | Bamford |
| 2009/0284482 A1 | 11/2009 | Chin |
| 2009/0288032 A1 | 11/2009 | Chang et al. |
| 2009/0293014 A1 | 11/2009 | Meuninck et al. |
| 2009/0298547 A1 | 12/2009 | Kim et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315847 A1 | 12/2009 | Fujii |
| 2009/0328101 A1* | 12/2009 | Suomela et al. ............... 725/40 |
| 2010/0008490 A1 | 1/2010 | Gharachorloo et al. |
| 2010/0023871 A1 | 1/2010 | Bederson et al. |
| 2010/0075628 A1 | 3/2010 | Ye |
| 2010/0079413 A1 | 4/2010 | Kawashima et al. |
| 2010/0087169 A1 | 4/2010 | Lin |
| 2010/0087173 A1 | 4/2010 | Lin |
| 2010/0088634 A1 | 4/2010 | Tsuruta et al. |
| 2010/0100839 A1 | 4/2010 | Tseng et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0167699 A1 | 7/2010 | Sigmund et al. |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0295795 A1 | 11/2010 | Wilairat |
| 2010/0311470 A1 | 12/2010 | Seo et al. |
| 2010/0321403 A1 | 12/2010 | Inadome |
| 2011/0018806 A1 | 1/2011 | Yano |
| 2011/0055773 A1 | 3/2011 | Agarawala et al. |
| 2011/0093778 A1 | 4/2011 | Kim et al. |
| 2011/0231796 A1 | 9/2011 | Vigil |
| 2012/0028687 A1 | 2/2012 | Wykes |
| 2012/0050185 A1 | 3/2012 | Davydov et al. |
| 2012/0179992 A1 | 7/2012 | Smuga |
| 2012/0212495 A1 | 8/2012 | Butcher |
| 2012/0244841 A1 | 9/2012 | Teng |
| 2013/0102366 A1 | 4/2013 | Teng |
| 2014/0068446 A1 | 3/2014 | Friedman |
| 2014/0094226 A1 | 4/2014 | Friedman |
| 2014/0109005 A1 | 4/2014 | Kruzeniski |
| 2014/0320415 A1 | 10/2014 | Wykes et al. |
| 2015/0040057 A1 | 2/2015 | Smuga et al. |
| 2015/0169079 A1 | 6/2015 | Wykes et al. |

FOREIGN PATENT DOCUMENTS

| | | |
|---|---|---|
| CN | 1936797 | 3/2007 |
| CN | 101047656 | 10/2007 |
| CN | 101127736 | 2/2008 |
| CN | 101228570 | 7/2008 |
| CN | 101296457 | 10/2008 |
| CN | 101308440 | 11/2008 |
| CN | 101311891 | 11/2008 |
| CN | 102197702 | 9/2011 |
| EP | 0583060 | 2/1994 |
| EP | 1469375 | 10/2004 |
| EP | 1752868 | 2/2007 |
| EP | 1959338 | 8/2008 |
| JP | H03246614 | 11/1991 |
| JP | H06242886 | 9/1994 |
| JP | H0897887 | 4/1996 |
| JP | 2001125913 | 5/2001 |
| JP | 2002229906 | 8/2002 |
| JP | 2003076460 | 3/2003 |
| JP | 2004227393 | 8/2004 |
| JP | 2004357257 | 12/2004 |
| JP | 2005517240 | 6/2005 |
| JP | 2005242661 | 9/2005 |
| JP | 2005539432 | 12/2005 |
| JP | 2006139615 | 6/2006 |
| JP | 2006163647 | 6/2006 |
| JP | 2007141249 | 6/2007 |
| JP | 2007243275 | 9/2007 |
| JP | 2007527065 | 9/2007 |
| JP | 2007258893 | 10/2007 |
| JP | 2008148054 | 6/2008 |
| JP | 2008204210 | 9/2008 |
| JP | 2008217808 | 9/2008 |
| JP | 2008536196 | 9/2008 |

(56) References Cited

FOREIGN PATENT DOCUMENTS

| | | |
|---|---|---|
| JP | 2008257442 | 10/2008 |
| JP | 2009015457 | 1/2009 |
| JP | 2009522666 | 6/2009 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 1020090041635 | 4/2009 |
| RU | 2254611 | 1/2005 |
| RU | 2308076 | 10/2007 |
| RU | 2345425 | 1/2009 |
| RU | 2347261 | 2/2009 |
| TW | 200404444 | 3/2004 |
| TW | 200828096 | 7/2008 |
| TW | 201023026 | 6/2010 |
| WO | WO-03062976 | 7/2003 |
| WO | WO-2003091034 | 11/2003 |
| WO | WO-2004097680 | 11/2004 |
| WO | WO-2005026931 | 3/2005 |
| WO | WO-2005027506 | 3/2005 |
| WO | WO-2006019639 | 2/2006 |
| WO | WO-2007030396 | 3/2007 |
| WO | WO-2007099424 | 9/2007 |
| WO | WO-2007121557 | 11/2007 |
| WO | WO-2007134623 | 11/2007 |
| WO | WO-2008030608 | 3/2008 |
| WO | WO-2008030976 | 3/2008 |
| WO | WO-2008031871 | 3/2008 |
| WO | WO-2008035831 | 3/2008 |
| WO | WO-2008104862 | 9/2008 |
| WO | WO-2008146784 | 12/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |

OTHER PUBLICATIONS

"Alltel Adds Dedicated Search Key to Phones", Retrieved from: <http://www.phonescoop.com/news/item.php?n=2159> on Nov. 26, 2008., (Apr. 12, 2007), 2 Pages.

"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007), 11 pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008), 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.

"Calc4M", Retrieved from: <http://www.hellebo.com/Calc4M.html> on Dec. 11, 2008, (Sep. 10, 2008), 4 Pages.

"Content-Centric E-Mail Message Analysis in Litigation Document Reviews", Retrieved from: http://www.busmanagement.com/article/Issue-14/Data-Management/Content-Centric-E-Mail-Message-Analysis-in-Litigation-Document-Reviews/., (May 6, 2009), 4 Pages.

"Dial a number", Retrieved from: <http://www.phonespell.org/ialhelp.html> on Nov. 20, 2008, 1 page.

"DuoSense™ Multi-Touch Gestures", Retrieved from: <http://www.n-trig.com/Data/Uploads/Misc/DuoSenseMTG_final.pdf>, (Jul. 2008), 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009), 2 pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008), 14 pages.

"Freeware.mobi", Retrieved from: <http://www.palmfreeware.mobi/download-palette.html>, (Oct. 9, 2001),2 pages.

"How do you dial 1-800-FLOWERS", Retrieved from: <http://blogs.msdn.com/windowsmobile/archive/2007/02/06/how-do-you-dial-1-800-flowers.aspx>, (Feb. 6, 2007), 24 pages.

"HTC Shows HTC Snap with Snappy Email Feature", Retrieved from: <http://www.wirelessandmobilenews.com/smartphones/_on_5/5/09>, (May 4, 2009), 10 Pages.

"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008), 11 pages.

"Internet Explorer Window Restrictions", Retrieved from: <http://www.addict3d.org/news/2012/download.html> on Oct. 22, 2008, Microsoft TechNet,(Oct. 22, 2008), 6 pages.

"Introduction to Windows Touch", Retrieved from: <http://download.microsoft.com/download/a/d/f/adf1347d-08dc-41a4-9084-623b1194d4b2/Win7_touch.docx>, (Dec. 18, 2008), pp. 1-7.

"Keyboard (5)", Retrieved from: <http://landru.uwaterloo.ca/cgi-bin/man.cgi?section=5&topic=keyboard> on Dec. 11, 2008., (Aug. 11, 1997), 8 Pages.

"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005), 5 pages.

"Kiosk Browser Chrome Customization Firefox 2.x", Retrieved from: <http://stlouis-shopper.com/cgi-bin/mozdev-wiki/,pl?ChromeCustomization> Oct. 22, 2008 Making a new chrome for the kiosk browser, Kiosk Project Kiosk Browser Chrome Customization Firefox-2.x,(Aug. 16, 2007), 2 pages.

"Live Photo Gallery—Getting Started—from Camera to Panorama", Retrieved from: <http://webdotwiz.spaces.live.com/blog/cns!2782760752B93233!1729.entry> on May 5, 2009., (Sep. 2008), 7 Pages.

"MIDTB Tip Sheet: Book Courier", Retrieved from: <http://www.midtb.org/tipsbookcourier.htm> on Dec. 11, 2008., (Sep. 26, 2005), 6 Pages.

"Mobile/UI/Designs/TouchScreen", Retrieved from: <https://wiki.mozilla.org/Mobile/UI/Designs/TouchScreen> on May 6, 2009., (Feb. 3, 2009), 15 Pages.

"Multi-touch", Retrieved from <http://en.wikipedia.org/wiki/Multi-touch#Microsoft_Surface> on Apr. 24, 2009, (Apr. 17, 2009), 8 pages.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006), 2 Pages.

"Oracle8i Application Developers Guide—Advanced Queuing Release 2 (8.1.6)", Retrieved from: http://www.cs.otago.ac.nz/oradocs/appdev.817/a76938/adq01in5.htm on May 6, 2009., (Dec. 1999), 8 pages.

"Oracle8i Application Developers Guide—Advanced Queuing", Retrieved from: http://www.cs.umbc.edu/help/oracle8/server.815/a68005/03_adq1i.htm on May 6, 2009., (Feb. 1999), 29 Pages.

"Oracle8i Concepts Release 8.1.5", Retrieved from: http://www.cs.umbc.edu/help/oracle8/server.815/a67781/c16queue.htm on May 6, 2009., (Feb. 1999), 10 Pages.

"Palette Extender 1.0.2", Retrieved from: <http://palette-extender.en.softonic.com/symbian> on Nov. 6, 2008, (Jan. 21, 2003), 2 pages "Parallax Scrolling", Retrieved from: <http://en.wikipedia.org/wiki/Parallax_scrolling> on May 5, 2009., (May 4, 2009), 3 Pages.

"PocketShield—New Screenlock App for the HTC Diamond and Pro", Retrieved from: <http://wmpoweruser.com/?tag=htc-touch-diamond> on Nov. 12, 2008, (Nov. 6, 2008), 13 pages.

(56) References Cited

OTHER PUBLICATIONS

"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005), 5 Pages.

"SecureMe—Anti-Theft Security Application for S60 3rd", Retrieved from: <http:/www.killermobile.com/newsite/mobile-software/s60-applications/secureme-%11-anti%11theft-security-application-for-s60-3rd.htm> on Nov. 12, 2008, (Nov. 11, 2008), 2 pages.

"Symbian Applications", Retrieved from: <http://symbianfullversion.blogspot.com/2008_12_01_archive.html> on May 5, 2009., (Jan. 2009), 51 Pages.

"Touch Shell Free", Retrieved from: <http://www.pocketpcfreeware.mobi/download-touch-shell-free.html> on May 5, 2009., (Feb. 23, 2009), 2 Pages.

"Winterface Review", Retrieved from: <http://www.mytodayscreen.com/winterface-review/> on Nov. 12, 2008, (Jul. 9, 2008), 42 pages.

"Womma", Retrieved from: <http://www.womma.org/blog/links/wom-trends/> on Nov. 5, 2009., (2007), 70 Pages.

Dolcourt, Jessica "Webware", Retrieved from: <http://news.cnet.com/webware/?categoryId=2010> on May 5, 2009., 13 Pages.

Gade, Lisa "Samsung Alias u740", Retrieved from: <http://www.mobiletechreview.com/phones/Samsung-U740.htm> on Nov. 20, 2008, (Mar. 14, 2007), 6 pages.

Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007), pp. 1-42.

Ha, Rick et al., "SIMKEYS: An Efficient Keypad Configuration for Mobile Communications", Retrieved from: <http://ieeexplore.ieee.org/stamp/stamp.jsp?arnumber=01362557.> on Dec. 17, 2008, (Nov. 2004), 7 Pages Harrison, Richard "Symbian OS C++ for Mobile Phones: Volume 3", Retrieved from: <http://_www.amazon.co.uk/Symbian-OS-Mobile-Phones-Press/dp/productdescription/0470066415> Oct. 23, 2008, Symbian Press, (Jun. 16, 2003), 4 pages.

Hickey, Andrew R., "Google Android has Landed; T-Mobile, HTC Unveil G1", Retrieved from: <http://crn.com/retail/210603348> on Nov. 26, 2008., (Sep. 23, 2008), 4 pages.

Kcholi, Avi "Windows CE .NET Interprocess Communication", Retrieved from http://msdn.microsoft.com/en-us/library/ms836784.aspx on Jul. 17, 2008., (Jan. 2004), 4 Pages.

Mann, Richard et al., "Spectrum Analysis of Motion Parallax in a 3D Cluttered Scene and Application to Egomotion", Retrieved from: <http://www.cs.uwaterloo.ca/~mannr/snow/josa-mann-langer.pdf.>, (Sep. 2005), pp. 1717-1731.

Mao, Jeng "Comments of Verizon Wireless Messaging Services, LLC", Retrieved from: http://www.ntia.doc.gov/osmhome/warnings/comments/verizon.htm on May 6, 2009., (Aug. 18, 2000), 5 Pages.

Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (Dec. 26, 2006), pp. 1757-1760.

Nordgren, Peder "Development of a Touch Screen Interface for Scania Interactor", Retrieved from: <http://www.cs.umu.se/education/examina/Rapporter/PederNordgren.pdf>, (Apr. 10, 2007), 67 Pages Oliver, Sam "Potential iPhone Usability and Interface Improvements", Retrieved from: <http://www.appleinsider.com/articles/08/09/18/potential_iphone_usability_and_interface_improvements.html>, on Nov. 12, 2008, (Sep. 18, 2008), 4 pages.

Oryl, Michael "Review: Asus P527 Smartphone for North America", Retrieved from: <http://www.mobileburn.com/review.jsp?Id=4257> on Dec. 17, 2008., (Mar. 5, 2008), 1 Page.

Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007), 4 Pages.

Raghaven, Gopal et al., "Model Based Estimation and Verification of Mobile Device Performance", Retrieved from http://alumni.cs.ucsb.edu/~raimisl/emsoft04_12.pdf., (Sep. 27-29, 2004), 10 Pages.

Reed, Brad "Microsoft Demos Windows Mobile 6.1 at CTIA", Retrieved from http://www.networkworld.com/news/2008/040208-ctia-microsoft-windows-mobile.html> on Jul. 18, 2008., (Apr. 2, 2008), 1 pages.

Remond, Mickael "Mobile Marketing Magazine", Retrieved from: <http://www.mobilemarketingmagazine.co.uk/mobile_social_networking/> on May 5, 2009., (Apr. 28, 2009), 16 Pages.

Rice, Stephen V., et al., "A System for Searching Sound Palettes", Retrieved from: <http://www.comparisonics.com/FindSoundsPalettePaper.pdf>, (Feb. 28-29, 2008), 6 pages.

Singh, Kundan et al., "CINEMA: Columbia InterNet Extensible Multimedia Architecture", Retrieved from http://www1.cs.columbia.edu/~library/TR-repository/reports/reports-2002/cucs-011-02.pdf, (Sep. 3, 2002), 83 Pages.

Steinicke, Frank et al., "Multi-Touching 3D Data: Towards Direct Interaction in Stereoscopic Display Environments coupled with Mobile Devices", Retrieved from: <http://viscg.uni-muenster.de/publications/2008/SHSK08/ppd-workshop.-pdf.>, (Jun. 15, 2008), 4 Pages.

Terpstra, Brett "Beta Beat: Grape, a New Way to Manage Your Desktop Clutter", Retrieved from: *Beta Beat: Grape, a New Way to Manage Your Desktop Clutter* on May 6, 2009., (Apr. 14, 2009), 16 Pages.

Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004), pp. 1-13.

Wilson, Tracy V., "How the iPhone Works", Retrieved from: <http://electronics.howstuffworks.com/iphone2.htm> Apr. 24, 2009, (Jan. 2007), 9 pages.

Yang, Seungji et al., "Semantic Photo Album Based on MPEG-4 Compatible Application Format", Retrieved from: <http://ieeexplore.ieee.org/stamp/stamp.jsp?arnumber=04146254.>, (2007), 2 Pages.

"International Search Report", Application No. PCT/US2010/028553, Application Filing Date: Mar. 24, 2010,(Nov. 9, 2010),9 pages.

"PCT Search Report and Written Opinion", Application No. PCT/US2010/034772, (Dec. 29, 2010),12 pages.

"PCT Search Report and Written Opinion", PCT Application No. PCT/US2010/038730, (Jan. 19, 2011),8 pages.

"PCT Search Report", Application Serial No. PCT/US2009/061864, (May 14, 2010),10 pages.

"PCT Search Report and Written Opinion", Application No. PCT/US2009/061382, (May 26, 2010),10 pages.

"PCT Search Report and Written Opinion", Application No. PCT/US2009/061735, (Jun. 7, 2010),11 pages.

"Non-Final Office Action", U.S. Appl. No. 12/244,545, (Aug. 17, 2011), 15 pages.

"Non-Final Office Action", U.S. Appl. No. 12/413,977, (07/19/11), 17 pages.

"Non-Final Office Action", U.S. Appl. No. 12/414,382, (Jul. 26, 2011), 9 pages.

"Non-Final Office Action", U.S. Appl. No. 12/414,434, (Aug. 2, 2011), 6 pages.

"Non-Final Office Action", U.S. Appl. No. 12/414,455, (Aug. 29, 2011), 8 pages.

"Non-Final Office Action", U.S. Appl. No. 12/414,458, (Jul. 6, 2011), 8 pages.

"Non-Final Office Action", U.S. Appl. No. 12/414,476, (Aug. 3, 2011), 21 pages.

"Non-Final Office Action", U.S. Appl. No. 12/433,605, (Jun. 24, 2011), 10 pages.

"Non-Final Office Action", U.S. Appl. No. 12/433,667, (Jun. 7, 2011), 15 pages.

"Non-Final Office Action", U.S. Appl. No. 12/469,458, (Jul. 1, 2011), 15 pages.

"Non-Final Office Action", U.S. Appl. No. 12/484,799, (Aug. 11, 2011), 12 pages.

(56) References Cited

OTHER PUBLICATIONS

"Notice of Allowance", U.S. Appl. No. 12/414,458, (Aug. 10, 2011), 6 pages.
"PCT Search Report and Written Opinion", Application No. PCT/US2010/028699, (Oct. 4, 2010), 10 pages.
"PCT Search Report and Written Opinion", Application No. PCT/US2010/028555, (Oct. 12, 2010), 10 pages.
"Final Office Action", U.S. Appl. No. 12/244,545, (Dec. 7, 2011), 16 pages.
"Final Office Action", U.S. Appl. No. 12/413,977, (Nov. 17, 2011), 16 pages.
"Final Office Action", U.S. Appl. No. 12/414,382, (Dec. 23, 2011), 7 pages.
"Final Office Action", U.S. Appl. No. 12/414,476, (Dec. 1, 2011), 20 pages.
"Final Office Action", U.S. Appl. No. 12/433 667 (Sep. 13, 2011), 17 pages.
"Final Office Action", U.S. Appl. No. 12/469,458, (Nov. 17, 2011), 15 pages.
"Non-Final Office Action", U.S. Appl. No. 12/469,419, (Nov. 9, 2011), 15 pages.
"Non-Final Office Action", U.S. Appl. No. 12/469,480, (Sep. 22, 2011), 14 pages.
"Non-Final Office Action", U.S. Appl. No. 12/470,558, (Nov. 22, 2011), 9 pages.
"Non-Final Office Action", U.S. Appl. No. 12/484,845, (Dec. 7, 2011), 16 pages.
"Notice of Allowance", U.S. Appl. No. 12/414,458, (Oct. 31, 2011), 2 pages.
"Notice of Allowance", U.S. Appl. No. 12/414,458, (Nov. 29, 2011), 2 pages.
La, Nick "Parallax Gallery", Available at <http://webdesignerwall.comtutorials/parallax-gallery/comment-page-1>,(Apr. 25, 2008),16 pages.
Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.
"Final Office Action", U.S. Appl. No. 12/244,545, (Sep. 7, 2012), 23 pages.
"Non-Final Office Action", U.S. Appl. No. 12/413,977, (Jul. 20, 2012), 18 pages.
"Non-Final Office Action", U.S. Appl. No. 12/469,458, (Sep. 21, 2012), 14 pages.
"Non-Final Office Action", U.S. Appl. No. 12/480,969, (Aug. 7, 2012), 15 pages.
"Non-Final Office Action", U.S. Appl. No. 12/484,799, (Aug. 7, 2012), 13 pages.
"Non-Final Office Action", U.S. Appl. No. 13/492,495, (Sep. 17, 2012), 8 pages.
"Notice of Allowance", U.S. Appl. No. 12/414,434, (Aug. 17, 2012), 4 pages.
"Notice of Allowance", U.S. Appl. No. 12/470,558, (Aug. 23, 2012), 2 pages.
"Final Office Action", U.S. Appl. No. 12/469,458, (Oct. 11, 2013), 24 pages.
"Foreign Office Action", Chinese Application No. 200980142661.5, (Sep. 24, 2013), 8 Pages.
"Foreign Office Action", Chinese Application No. 201080015802.X, (Sep. 29, 2013), 11 Pages.
"Foreign Office Action", Japanese Application No. 2011-530109, (Jul. 18, 2013), 4 Pages.
"Non-Final Office Action", U.S. Appl. No. 13/418,884, (Sep. 30, 2013), 7 pages.
"Supplemental Notice of Allowance", U.S. Appl. No. 12/433,667, (Oct. 10, 2013), 2 pages.
"Final Office Action", U.S. Appl. No. 12/480,969, Feb. 21, 2014, 21 pages.
"Foreign Office Action", JP Application No. 2011-533280, Nov. 26, 2013, 4 Pages.

"EP Search Report", European Application No. 10762112.0, (Aug. 2, 2013), 7 Pages.
"Final Office Action", U.S. Appl. No. 12/480,969, (Jul. 24, 2013), 19 pages.
"Foreign Office Action", Chinese Application No. 200980142644.1, (Aug. 20, 2013), 9 Pages.
"Foreign Office Action", Japanese Application No. 2011-533353, (Jul. 05, 2013), 9 Pages.
"Foreign Office Action", Chilean Application No. 2379-2011, (Jul. 3, 2013), 8 pages.
"Foreign Office Action", Chinese Application No. 200980139831.4, (Jul. 1, 2013), 12 pages.
"Non-Final Office Action", U.S. Appl. No. 12/469,480, (Aug. 27, 2013), 22 pages.
"Supplemental Notice of Allowance", U.S. Appl. No. 12/433,667, (Aug. 1, 2013), 2 pages.
"Final Office Action", U.S. Appl. No. 12/469,480, (Dec. 5, 2013), 24 pages.
"Foreign Office Action", Chinese Application No. 201080015728.1, (Oct. 29, 2013), 8 Pages.
"Foreign Office Action", JP Application No. 2012-503514, (Aug. 7, 2013), 5 pages.
"Foreign Office Action", Mexican Application No. MX/a/2011/012279, (Jul. 4, 2013), 3 Pages.
"Non-Final Office Action", U.S. Appl. No. 12/414,476, (Oct. 25, 2013), 18 pages.
"Non-Final Office Action", U.S. Appl. No. 12/433,605, (Nov. 6, 2013), 16 pages.
"Non-Final Office Action", U.S. Appl. No. 12/480,969, (Oct. 29, 2013), 22 pages.
"Non-Final Office Action", U.S. Appl. No. 13/270,111, (Oct. 21, 2013), 9 pages.
"Non-Final Office Action", U.S. Appl. No. 12/244,545, Dec. 19, 2013, 22 pages.
"Foreign Office Action", JP Application No. 2011-533353, Nov. 26, 2013, 4 pages.
"Foreign Office Action", JP Application No. 2012-503515, Nov. 18, 2013, 5 Pages.
"Final Office Action", U.S. Appl. No. 13/418,884, Dec. 30, 2013, 8 pages.
"Advisory Action", U.S. Appl. No. 12/414,382, (Jan. 20, 2012), 3 pages.
"Final Office Action", U.S. Appl. No. 12/433,605, (Feb. 3, 2012), 11 pages.
"Final Office Action", U.S. Appl. No. 12/469,480, (Feb. 9, 2012), 17 pages.
"Non-Final Office Action", U.S. Appl. No. 12/414,434, (Jan. 17, 2012), 7 pages.
"Non-Final Office Action", U.S. Appl. No. 12/433,667, (Feb. 3, 2012), 16 pages.
"Notice of Allowance", U.S. Appl. No. 12/414,455, (Jan. 4, 2012), 4 pages.
"Final Office Action", U.S. Appl. No. 12/433,605, (Jul. 17, 2013), 13 pages.
"Foreign Office Action", Chinese Application No. 200980142632.9, (Jun. 14, 2013), 6 pages.
"Foreign Office Action", Japanese Application No. 2012-503523, (Apr. 22, 2013), 5 Pages.
"Advisory Action", U.S. Appl. No. 12/433,605, (Apr. 5, 2012), 3 pages.
"Extended European Search Report", European Patent Application No. 09818253.8, (Apr. 10, 2012), 7 pages
"Final Office Action", U.S. Appl. No. 12/484,799, (Apr. 30, 2012), 13 pages.
"Non-Final Office Action", U.S. Appl. No. 12/244,545, (Mar. 27, 2012), 18 pages.
"Non-Final Office Action", U.S. Appl. No. 12/414,434, (May 31, 2012), 7 pages.
"Non-Final Office Action", U.S. Appl. No. 12/469,419, (May 23, 2012), 13 pages.
"Notice of Allowance", U.S. Appl. No. 12/414,382, (Apr. 4, 2012), 4 pages.

(56) References Cited

OTHER PUBLICATIONS

"Notice of Allowance", U.S. Appl. No. 12/470,558, (Apr. 2, 2012), 7 pages.
"Notice of Allowance", U.S. Appl. No. 12/484,845, (Mar. 16, 2012), 5 pages.
Beiber, Gerald et al., "Screen Coverage: A Pen-Interaction Problem for PDA's and Touch Screen Computers", In Proceedings of ICWMC 2007,(Mar. 2007), 6 pages.
Wyatt, Paul "/Flash/the art of parallax scrolling", .net Magazine,(Aug. 1, 2007), pp. 74-76.
"Final Office Action", U.S. Appl. No. 12/414,476, (Apr. 8, 2013), 25 pages.
"Final Office Action", U.S. Appl. No. 12/469,480, (Apr. 10, 2013), 21 pages.
"Foreign Office Action", Chinese Application No. 200980142644.1, (Apr. 3, 2013),10 pages.
"Foreign Office Action", Chinese Application No. 201080015728.1, (May 16, 2013),10 pages.
"Foreign Office Action", Chinese Application No. 201080015788.3, (Jun. 5, 2013), 12 Pages.
"Foreign Office Action", Chinese Application No. 201080023212.1, (Jun. 5, 2013), 8 pages.
"Introducing Application Styling for Windows Forms", *Infragistics Software Manual, Version 7.3.20073.1043*, (Nov. 2007), 95 pages.
"Non-Final Office Action", U.S. Appl. No. 12/469,458, (May 3, 2013), 21 pages.
"Non-Final Office Action", U.S. Appl. No. 12/480,969, (Apr. 4, 2013), 22 pages.
"Notice of Allowance", U.S. Appl. No. 12/433,667, (Jun. 25, 2013),14 pages.
"Notice of Allowance", U.S. Appl. No. 13/492,495, (Apr. 26, 2013), 5 pages.
"Final Office Action", U.S. Appl. No. 12/433,667, (Jan. 7, 2013), 17 pages.
"Final Office Action", U.S. Appl. No. 12/480,969, (Nov. 23, 2012), 18 pages.
"Foreign Office Action", Chinese Application No. 201080015728.1, (Dec. 26, 2012), 9 pages.
"Foreign Office Action", Chinese Application No. 201080015788.3, (Dec. 24, 2012), 10 pages.
"Foreign Office Action", Chinese Application No. 201080023212.1, (Dec. 5, 2012), 10 pages.
"Non-Final Office Action", U.S. Appl. No. 12/414,476, (Nov. 9, 2012), 22 pages.
"Non-Final Office Action", U.S. Appl. No. 12/433,605, (Jan. 11, 2013), 7 pages.
"Non-Final Office Action", U.S. Appl. No. 12/469,480, (Oct. 17, 2012), 16 pages.
"Non-Final Office Action", U.S. Appl. No. 13/492,495, (Dec. 19, 2012), 6 pages.
"Notice of Allowance", U.S. Appl. No. 12/469,419, (Nov. 27, 2012), 13 pages.
"Notice of Allowance", U.S. Appl. No. 12/484,799, (Oct. 22, 2012), 10 pages.
"Extended European Search Report", European Patent Application No. 09822736.6, (Dec. 18, 2012), 7 pages.
"Final Office Action", U.S. Appl. No. 12/469,458, (Feb. 1, 2013), 19 pages.
"Foreign Office Action", Chinese Application No. 200980142632.9, (Jan. 29, 2013), 11 pages.
"Foreign Office Action", Chinese Application No. 200980142661.5, (Jan. 21, 2013), 12 pages.
Crouch, Dennis "Smartphone Wars: Micron's Slide-to-Unlock Patent", (Jan. 30, 2013), 2 pages.
"Foreign Notice of Allowance", AU Application No. 2010234909, May 2, 2014, 3 pages.
"Foreign Notice of Allowance", JP Application No. 2012-516218, Nov. 4, 2014, 4 Pages.
"Corrected Notice of Allowance", U.S. Appl. No. 13/270,111, Jun. 23, 2014, 3 pages.
"Extended European Search Report", EP Application No. 10762120.3, Aug. 22, 2014, 9 pages.
"Foreign Office Action", CN Application No. 201080027409.2, Aug. 5, 2014, 12 Pages.
"Non-Final Office Action", U.S. Appl. No. 13/461,656, Aug. 8, 2014, 27 pages.
"Notice of Acceptance", AU Application No. 2010260165, Jun. 23, 2014, 3 Pages.
"Notice of Allowance", U.S. Appl. No. 13/418,884, Aug. 5, 2014, 4 pages.
"Notice of Allowance", U.S. Appl. No. 13/712,777, Jul. 2, 2014, 4 pages.
Faaborg, "The Design Review Episode 2: Chromeless Browsing", Available at: http://vimeo.com/2836740, Jan. 15, 2009, 3 pages.
"Extended European Search Report", EP Application No. 10778152.8, Apr. 14, 2015, 7 pages.
"Final Office Action", U.S. Appl. No. 13/461,656, May 7, 2015, 24 pages.
"Foreign Notice of Allowance", RU Application No. 2011151097, Feb. 26, 2015, 16 pages.
"Foreign Office Action", CN Application No. 201080027409.2, Apr. 20, 2015, 14 Pages.
"Foreign Office Action", EP Application No. 10790080.5, May 18, 2015, 6 Pages.
"Foreign Office Action", IL Application No. 214804, Mar. 12, 2015, 6 Pages.
"Non-Final Office Action", U.S. Appl. No. 13/776,533, May 19, 2015, 52 pages.
"Supplementary European Search Report", EP Application No. 10790080.5, Apr. 21, 2015, 3 pages.
"Foreign Notice of Allowance", CN Application No. 201080015802.X, Sep. 10, 2014, 6 Pages.
"Foreign Notice of Allowance", JP Application No. 2012-511905, Sep. 24, 2014, 4 pages.
"Foreign Notice of Allowance", RU Application No. 2011147058, May 23, 2014, 13 pages.
"Foreign Office Action", CN Application No. 200980139831.4, Oct. 10, 2014, 10 Pages.
"Intent to Grant", EP Application No. 10762112.0, Aug. 28, 2014, 5 Pages.
"Notice of Allowance", U.S. Appl. No. 14/330,221, Oct. 16, 2014, 7 pages.
"Foreign Notice of Allowance", JP Application No. 2012-503523, Oct. 24, 2013, 4 pages.
"Foreign Office Action", AU Application No. 2010234909, Mar. 17, 2014, 4 Pages.
"Foreign Office Action", CN Application No. 200980139831.4, Mar. 24, 2014, 9 Pages.
"Foreign Office Action", CN Application No. 200980142644.1, Mar. 5, 2014, 7 Pages.
"Foreign Office Action", JP Application No. 2012-511905, Jan. 28, 2014, 6 Pages.
"Foreign Office Action", RU Application No. 2011147058, Feb. 12, 2014, 6 Pages.
"Non-Final Office Action", U.S. Appl. No. 13/418,884, Mar. 10, 2014, 8 pages.
"Non-Final Office Action", U.S. Appl. No. 13/712,777, Mar. 20, 2014, 7 pages.
"Notice of Allowance", U.S. Appl. No. 13/270,111, Mar. 7, 2014, 6 pages.
"Corrected Notice of Allowance", U.S. Appl. No. 14/330,221, Feb. 2, 2015, 2 pages.
"Foreign Office Action", RU Application No. 2011151097, Dec. 9, 2014, 7 pages.
"Corrected Notice of Allowance", U.S. Appl. No. 13/270,111, Jun. 17, 2014, 2 pages.
"Final Office Action", U.S. Appl. No. 12/244,545, May 6, 2014, 24 pages.
"Final Office Action", U.S. Appl. No. 12/414,476, Apr. 24, 2014, 19 pages.
"Foreign Office Action", AU Application No. 2010260165, Mar. 25, 2014, 3 Pages.

(56) References Cited

OTHER PUBLICATIONS

"Foreign Office Action", AU Application No. 2010260165, May 1, 2014, 3 Pages.

"Foreign Office Action", CN Application No. 201080015802.X, May 19, 2014, 7 Pages.

"Foreign Office Action", JP Application No. 2011-530109, May 2, 2014, 4 Pages.

"Foreign Office Action", JP Application No. 2012-516218, Mar. 6, 2014, 6 Pages.

"Non-Final Office Action", U.S. Appl. No. 13/418,884, Jun. 16, 2014, 8 pages.

"Notice of Allowance", U.S. Appl. No. 12/433,605, Apr. 25, 2014, 4 pages.

"Foreign Office Action", TW Application No. 98135986, Jun. 10, 2015, 13 Pages.

"Foreign Office Action", IL Application No. 215757, May 18, 2015, 6 Pages.

"Non-Final Office Action", U.S. Appl. No. 13/835,603, Jun. 26, 2015, 8 pages.

\* cited by examiner

MOBILE COMMUNICATIONS DEVICE USER INTERFACE

RELATED APPLICATIONS

This application claims priority under 35 U.S.C. Section 119(e) to U.S. Provisional Patent Applications Nos. 61/107,945, 61/107,935, and 61/107,921, each of which was filed on Oct. 23, 2008, the entire disclosures of which are hereby incorporated by reference in their entirety.

BACKGROUND

Mobile communication devices (e.g., wireless phones) have become an integral part of everyday life. However, the form factor employed by conventional mobile communications devices is typically limited to promote mobility of the device.

For example, the mobile communications device may have a relatively limited amount of display area when compared to a conventional desktop computer, e.g., a PC. Therefore, conventional techniques used to interact with a desktop computer may be inefficient when employed by a mobile communications device. For example, traditional menus may consume a significant amount of display area of the display device thereby limiting the amount of display area that is available for content.

SUMMARY

A mobile communications device user interface is described. In an implementation, a method is implemented by a computing device that includes displaying content in conjunction with a first level of a hierarchical menu in a user interface on a display device of the computing device. Responsive to receipt of an input to navigate to a second level of the hierarchical menu that is a sublevel of the first level, the second level in displayed conjunction with the content on the display device, the content having a reduced display richness when displayed in conjunction with the second level than when displayed in conjunction with the first level.

In an implementation, one or more computer-readable storage media include instructions that are executable by a mobile communications device to cause output of a user interface on a touchscreen of the mobile communications device. The user interface has a hierarchical structure in which a root level of the hierarchical structure includes a first menu item that is selectable via the touchscreen to initiate a primary action and a second menu item that is selectable to cause display of a sublevel of the hierarchical structure that includes a plurality of menu items. One or more of the plurality of menu items are selectable to initiate a respective action and at least one of the plurality of menu items is selectable to cause display of another sublevel of the hierarchical structure.

In an implementation, a mobile communications device includes a touchscreen, a processor, and memory configured to maintain an operating system. The operating system is executable on the processor to display a user interface on the touchscreen that is scrollable via a gesture received via the touchscreen. The user interface is configured for display on the touchscreen to include one or more menu items when the user interface is not scrolled and configured to not display at least a portion of the one or more menu items when the user interface is scrolled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
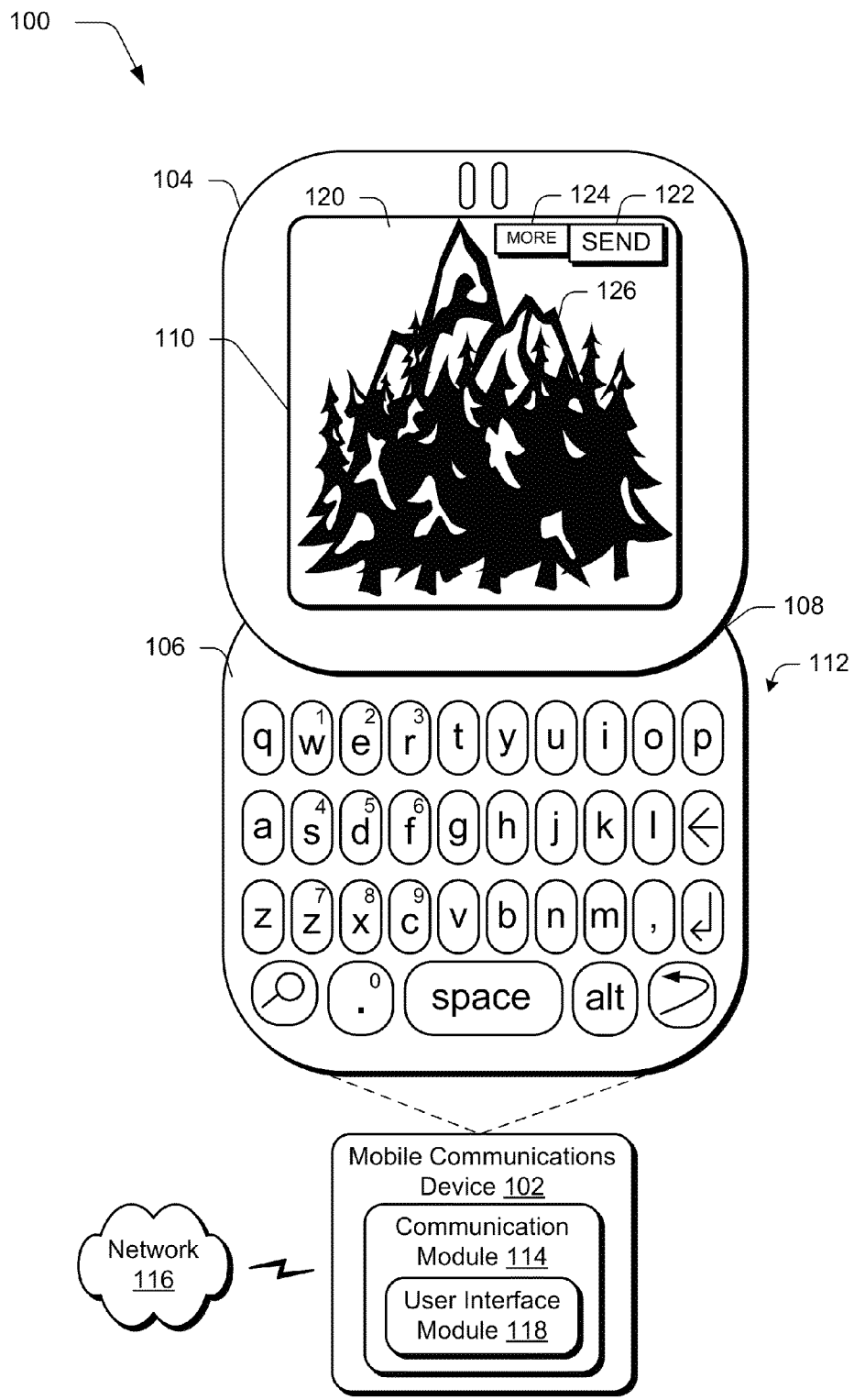
FIG. 1 is an illustration of an example implementation of a mobile communications device in accordance with one or more embodiments of devices, features, and systems for mobile communications.

Mobile communications devices typically have a small form factor to aide mobility of the mobile communications device. For example, the mobile communications device (e.g., a mobile phone) may be configured with a relatively minimal amount of display area and limited input devices (e.g., a keypad) so that the device may be easily transported. Consequently, traditional techniques used to interact with a conventional computer (e.g., a desktop PC) may be frustrating when used in conjunction with a mobile communications device.

For instance, use of a conventional menu and tool bar may consume a significant amount of display area of a display device, even when not being used. Consequently, conventional menus may limit the amount of display area that is available to display content, such as images, contact information, documents, and so on.

In an implementation, a user interface is described that limits the amount of "chrome" this is displayed when the menu is not in use. For example, the menu may be configured to include a root level having a menu item that is selectable to initiate a primary action and another menu item that is selectable to navigate "down" through the hierarchy to additional actions. In this way, the user interface may include a menu that includes a primary action that is likely to be initiated by a user (e.g., output based on the type of content that is displayed in conjunction with the menu) without forcing the user to navigate to a submenu yet still provide the user with an option to navigate through the hierarchy to access additional actions. Further discussion of hierarchical navigation may be found in relation to FIGS. 2 and 3.

In another implementation, a user interface is described that configures underlying content to provide an indication of a level at which a user has currently navigated in a hierarchical structure. Continuing with the previous example, the user may navigate through successive levels of the hierarchy to locate a desired action. During this navigation, the content that is displayed in conjunction with the menu may be displayed in succession as having a decreased display richness, e.g., darker, less color, less contrast, and so on. Thus, the content may be used to reflect a relative level of the hierarchy and thus limit the amount of chrome that was traditionally utilized to indicate a current location within the hierarchy. Further discussion of display richness and hierarchical levels may be found in relation to FIGS. 4 and 6.

In a further implementation, a user interface is described that is configured to temporarily hide at least a portion of a user interface when scrolling. For example, the user interface may be configured to display a menu as an overlay over a display of content. When the content is scrolled, the menu may be output as part of an animation to make it appear that the menu follows inertia of the scrolling content, e.g., direction and speed, to hide at least a portion of the menu. When the scrolling stops, the animation may cause the menu to reappear, e.g., as the scrolling is slowed. Further discussion of scrolling may be found in relation to FIG. 5.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as personal digital assistants, mobile music players, dedicated messaging devices, portable game devices, netbooks, and so on.

Example Implementations

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration as illustrated in FIG. 1 in which the mobile communications device 102 is "open" and a configuration in which the mobile communications device 102 is "closed" as illustrated in FIGS. 2-5.

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of content, such as a caller identification (ID), contacts, images (e.g., photos) as illustrated, email, multimedia messages, Internet browsing, game play, music, video, and so on. In an implementation, the display device 110 is configured to function as an input device by incorporating touchscreen functionality, e.g., through capacitive, surface acoustic wave, resistive, optical, strain gauge, dispersive signals, acoustic pulse, and other touchscreen functionality. The touchscreen functionality (as well as other functionality such as track pads) may be used to detect gestures, further discussion of which may be found in relation to FIG. 5.

The second housing 106 is illustrated as including a keyboard 112 that may also be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

In the "open" configuration as illustrated in the example implementation 100 of FIG. 1, the first housing 104 is moved (e.g., slid) "away" from the second housing 106 using the slide 108. Other implementations are also contemplated, such as a "clamshell" configuration, "brick" configuration, and so on.

The form factor employed by the mobile communications device 102 may be suitable to support a wide variety of features. For example, the keyboard 112 is illustrated as supporting a QWERTY configuration. This form factor may be convenient to a user to utilize the previously described functionality of the mobile communications device 102, such as to compose texts, play games, check email, "surf" the Internet, provide status messages for a social network, and so on.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to capture content, form short message service (SMS) text messages, multimedia messaging service (MMS) messages, emails, status updates to be communicated to a social network service, and so on. A user, for instance, may input a status update for communication via the network 116 to the social network service. The social network service may then publish the status update to "friends" of the user, e.g., for receipt by the friends via a computer, respective mobile communications devices, and so on. A variety of other examples are also contemplated, such as blogging, instant messaging, and so on.

The mobile communications device 102 is also illustrated as including a user interface module 118. The user interface module 118 is representative of functionality of the mobile communications device 102 to generate, manage, and/or output a user interface 120 for display on the display device 110. A variety of different techniques may be employed to generate the user interface.

For example, the user interface module 118 may configure the user interface 120 to output a root level of a hierarchical menu. In the illustrated example, output of the root level includes a first menu item 122 that is selectable to initiate a primary action "send." A second menu item 124 is also included that is selectable to navigate to a submenu of the hierarchy, which is illustrated as "more" in the figure. In this way, the output of the root level has limited intrusion on an amount of display area of the display device 110 that is available to output underlying content 126 yet still provides at least a single action that is selectable without navigating through the hierarchy. Additional menu items may then be displayed by navigating through the hierarchy, further discussion of which may be found in relation to the following figure.

Figure 2:
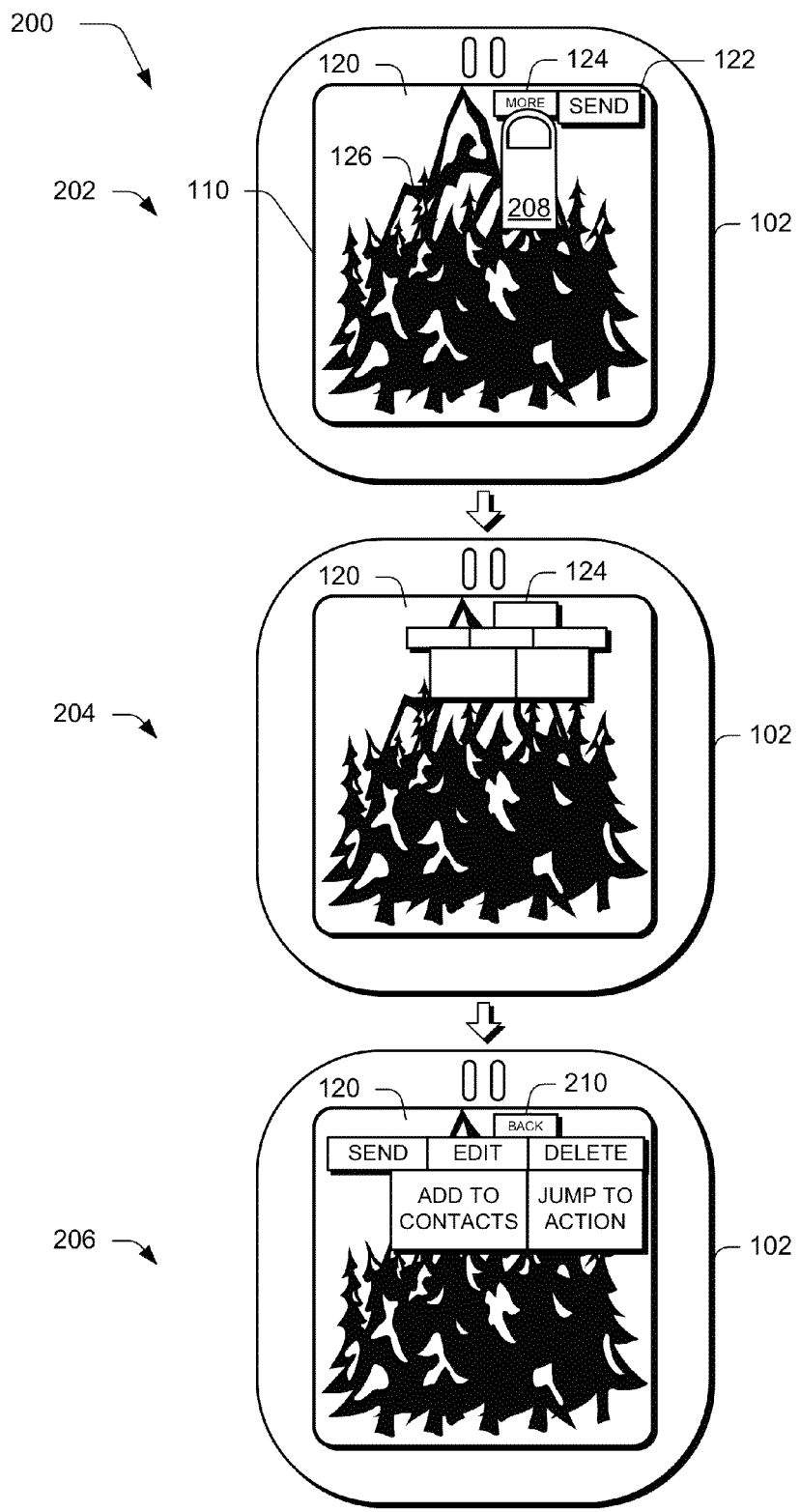
FIG. 2 is an illustration of a mobile communications device of FIG. 1 in an example implementation that shows an animation that is output in response to navigation to a submenu.

FIG. 2 is an illustration of a system 200 showing the mobile communications device 102 of FIG. 1 in an example implementation that shows an animation that is output in response to navigation to a submenu. Three different stages of the mobile communications device 102 are illustrated in FIG. 1 as a first stage 202, a second stage 204, and a third stage 206.

In the first stage 202, the display device 110 is illustrated as displaying the user interface 120 to include a root level of a hierarchical menu having the first and second menu items 122, 1224 as previously described. In this example, the menu is displayed as an overlay "over" the content 126, which is an image as previously described. For example, the image may be captured using an image capture device of the mobile communications device 102, an image obtained via the network 116, and so on.

As previously described, the first menu item 122 of the root level of the hierarchical menu is selectable to initiate an action. This action may be selected by the user interface module 118 from a variety of different actions, such as based on the underlying content 126 that is currently being displayed in the user interface 120, applications that are currently "running" on the mobile communications device 102, and so on. Thus, the user interface 120 may be configured to enable selection of an action that is likely to be of interest to a user without forcing the user to first navigate "through" a hierarchy. Less likely actions may then be positioned accordingly at successive levels of the hierarchical menu.

In the first stage, a user's finger 208 is illustrated as selecting the second menu item 124 "more." This selection is received using touchscreen functionality of the display device 110. In this example, selection of the menu item 124 initiates output of an animation as further illustrated in the second stage 204 of the mobile communications device 102.

In the second stage 204, menu items that are included in a submenu of the hierarchy are animated to expand outwards in a radial manner from the point of selection on the display device, e.g., the menu item 124 "more" of the first stage 202. In the illustrated example, text is not included on the menu items in the sublevel during the expansion, although it should be readily apparent that in alternate embodiments text may be included on the menu items.

Additionally, the menu items themselves may also be animated to expand in size from the initiating menu item. For example, the menu items may expand outwards from the initiating menu item (e.g., the second menu item 124) and expand in size until reaching a final placement and size as shown in the third stage 206. Text in the menu items may also expand with the menu items in an embodiment.

The menu items in the third stage 206 correspond to a sublevel of the hierarchical structure of the root level shown in the first stage 202. In an implementation, the menu items that are selectable to initiate an action involving the content 126 that are included in the sublevel are less likely to be of interest to a user that a primary action that corresponds to the first menu item 122 in the root level. Further, the second menu item 124 "more" has been changed to a sublevel menu item 210 "back" to cause navigate back "up" through the hierarchy to the root level. In this way, a user may use a single portion of the user interface 120 to navigate back and forth between levels of the hierarchy. One or more menu items in the sublevel are also selectable to cause output of an additional level in the hierarchy and thus the hierarchy may mimic a tree structure having a variety of different branches and levels, further discussion of which may be found in relation to the following figure.

Figure 3:
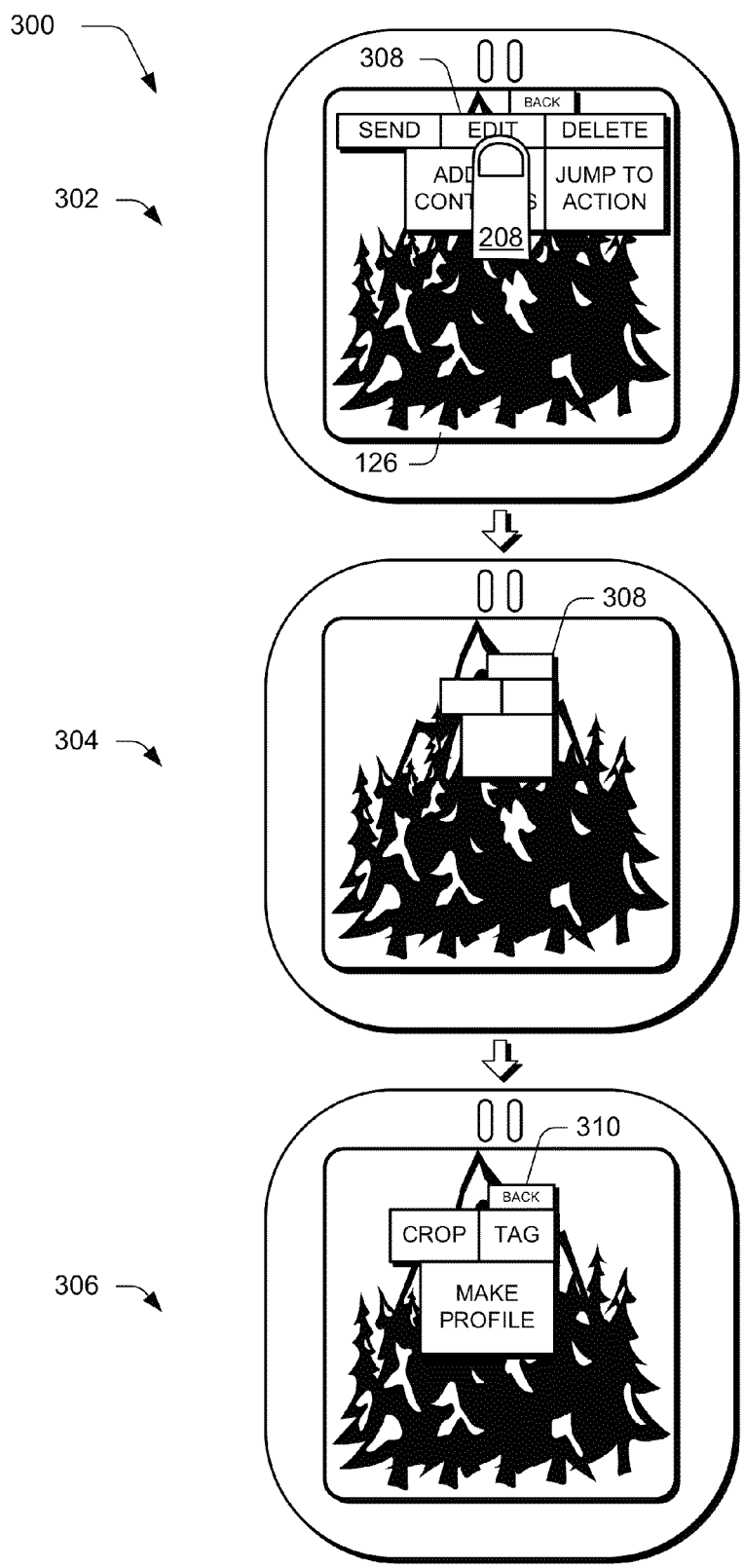
FIG. 3 is an illustration of the mobile communications device of FIG. 1 in an example implementation that shows animation and navigation to an additional submenu of the hierarchical menu shown in FIG. 2.

FIG. 3 is an illustration of the mobile communications device of FIG. 1 in an example implementation of a system 300 that shows animation and navigation to an additional submenu of the hierarchical menu shown in FIG. 2. Like FIG. 2, the current figure includes first, second, and third stages 302, 304, 306 of an animation that is output in response to navigation through a hierarchical menu.

In the first stage 302, the user's finger 208 is illustrated as selecting a menu item 308 "edit" that is to be applied to the underlying content 126. In response, menu items to be included in another submenu are animated as expanding outwardly and growing in size as illustrated in the second stage 304. Completion of the animation is illustrated in the third stage 306 in which the other sublevel (i.e., the third level of the hierarchical menu) is displayed as having menu items "crop," "tag," and "make profile." As before, the menu item 308 has changed to a "back" menu item 310 to permit navigation back through the hierarchy.

Thus, as shown in FIGS. 2 and 3, a menu technique is described that may be utilized by a touchscreen user interface. At the root level 202, this technique reduces available actions in a specific context to only two menu options: a primary and a secondary option. The primary action is the most prominent menu item (e.g., the first menu item 122) and may be selected to be the "most important" action in any given context, e.g., most likely to be used.

When selected, the second menu item 124 causes a cascade of the next level of actions to expand outwards radially from the touch point. This helps to make the sub-menu actions visible even while the user's finger 208 occludes the display device 110, which is an ergonomic consideration for touch interfaces. Additionally, the placement and specific design of the menu techniques does not involve permanent menu bars on the screen, again leaving more room for display of content 126 on the display device 110. Thus, as described in this example a user may navigate through various levels of a hierarchy to locate and utilize desired actions. A variety of different techniques may be employed to describe "where" in the hierarchy the user is currently located, i.e., what level and/or branch is currently being displayed, an example of which may be found in relation to the following figure.

Figure 4:
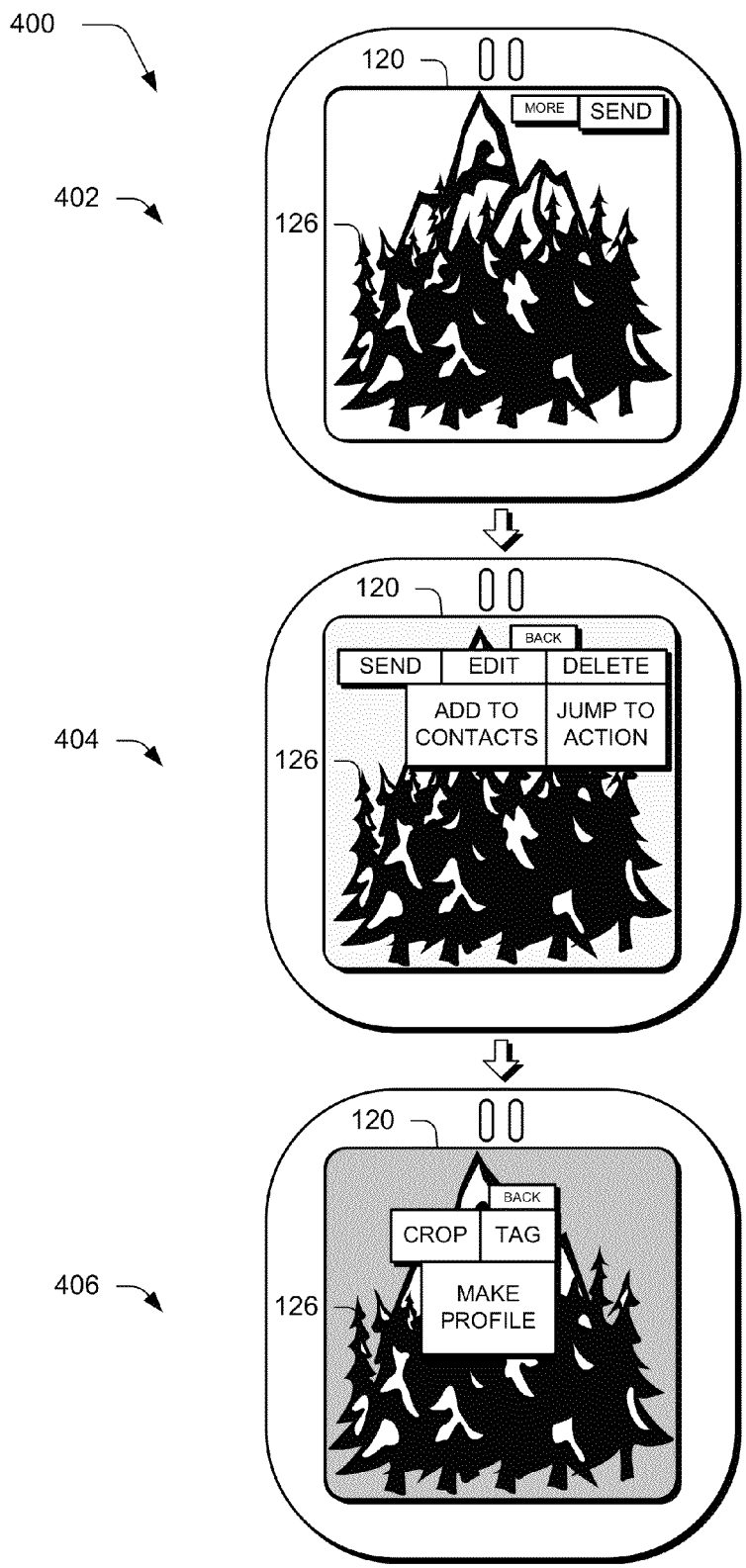
FIG. 4 is an illustration of the mobile communications device of FIG. 1 in an example implementation that shows content having reduced display richness when displayed in conjunction with successively lower levels of a hierarchical menu.

FIG. 4 is an illustration of the mobile communications device 102 of FIG. 1 in an example implementation 400 that shows content having reduced display richness when displayed in conjunction with successively lower levels of a hierarchical menu. In this example, first, second, and third stages 402, 404, 406 are illustrated that correspond to successive levels of a hierarchy. The first stage 402 corresponds to the root level as previously described in relation to the first stage 202 of FIG. 2 and the second stage 404 corresponds to the sublevel as previously described in relation to the third stage 206 of FIG. 2. The third stage 406 corresponds to the third stage 306 of FIG. 3.

In each of the successive stages, display of the underlying content 126 is changed to indicate a respective level in the hierarchy that is currently being displayed. For example, the display richness of the underlying content may be reduced as a user navigates "down" through the hierarchical levels. The display richness may be altered in a variety of ways, such as through color saturation, "darkening," desaturation, contrast, brightness, and any other display quality without departing from the spirit and scope thereof.

In the illustrated example, the display of the content 126 is darkened successively in the second and third stages 404,

406. Therefore, the display of the content 126 in the second stage 404 is darker than the first stage 402 and the display of the content 126 in the third stage 406 is darker than the second stage 404. In this way, the display of the content 126 gives an indication of a relative level of the hierarchy that is currently being displayed without adding "chrome," e.g., additional description showing a file path in the user interface 120. Although darkening has been described, it should be readily apparent that a wide variety of techniques may be used to modify a display of content to indicate a relative level in a hierarchical menu that is concurrently displayed with the menu.

Figure 5:
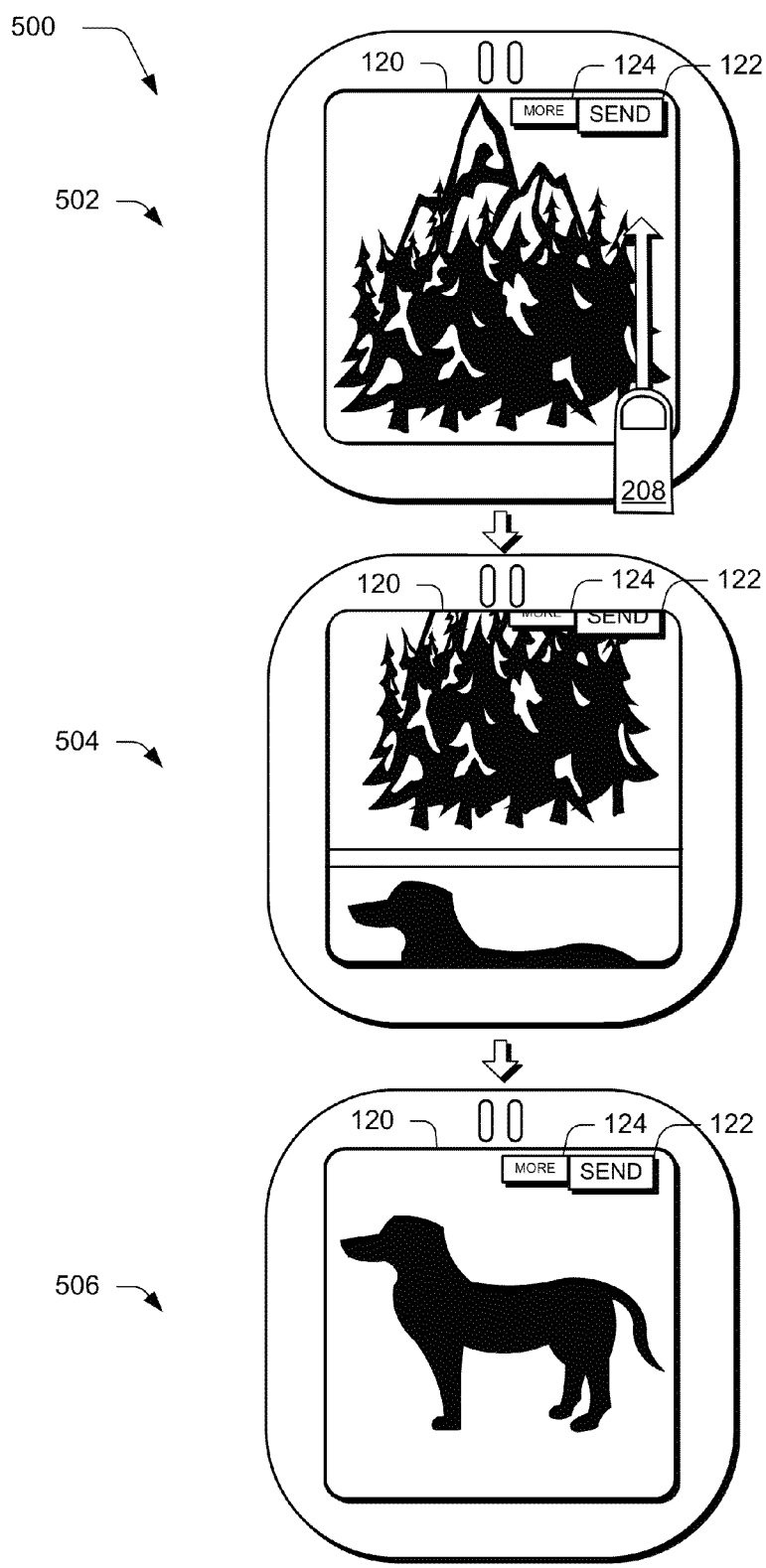
FIG. 5 is an illustration of the mobile communications device of FIG. 1 in an example implementation in which menu items are configured to follow inertia of a scrolling user interface.

FIG. 5 is an illustration of the mobile communications device of FIG. 1 in an example implementation 500 in which menu items are configured to follow inertia of a scrolling user interface. The illustration 500 includes first, second, and third stages 502, 504, 506. In the first stage 502, a gesture is input using the user's finger 208 to cause the user interface 120 to scroll upward. Before input of the gesture, the first and second menu items 122, 124 are shown in their entirety.

In response to this gesture, the user interface 120 is scrolled in the second stage 504. In response to this scrolling, the first and second menu items 122, 124 "follow" the inertia of the scroll such that at least a portion of the items is no longer displayed. Thus, the first and second menu items 122, 124 follow the user interface 120 in the direction of the scroll so that a portion of the items is no longer displayed. However, at least a portion of one or more of the first and second menu items 122, 124 is continued to be displayed during the scroll. Thus, although the first and second menu items 122, 124 follow the inertia of the scroll the scroll is allowed to continue beneath the menu items so that at least a portion of the items continue to be displayed.

Once the scroll is completed, the first and second menu items 122, 124 are again displayed in their entirety. For example, as the scroll slows the first and second menu items 122, 124 may be animated to return to view in a manner that follows the scroll of the user interface 120. A variety of other examples are also contemplated without departing from the spirit and scope thereof.

Example Procedures

The following discussion describes user interface techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and systems 200-500 of FIGS. 1-5, respectively.

Figure 6:
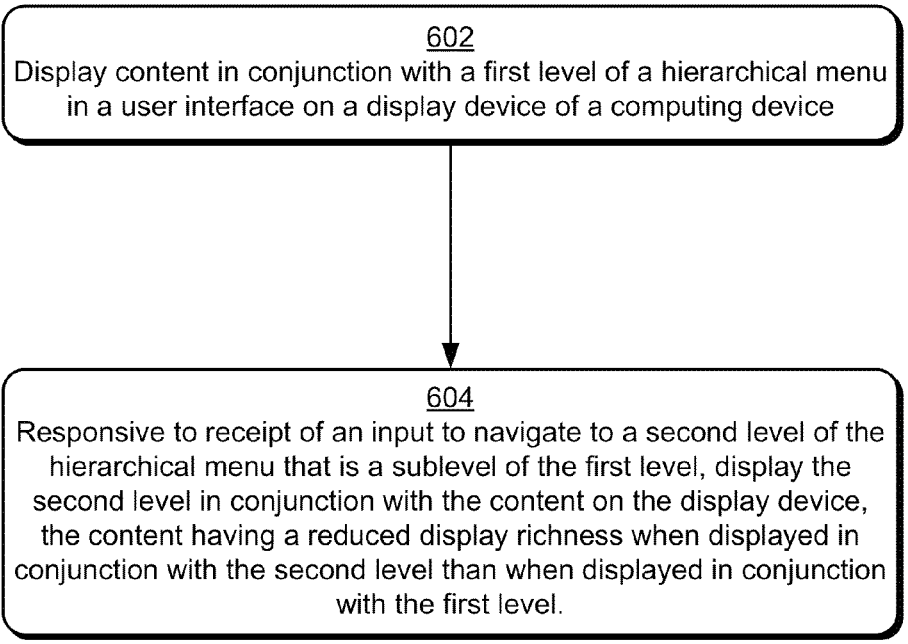
FIG. 6 is a flow diagram depicting a procedure in an example implementation in which content has different amount of display richness when displayed with different levels of a hierarchical menu.

FIG. 6 is a flow diagram depicting a procedure in an example implementation in which content has different amount of display richness when displayed with different levels of a hierarchical menu. Content is displayed by a computing device in conjunction with a first level of a hierarchical menu in a user interface on a display device of the computing device (block 602). As shown in the first stage 402 of FIG. 4, for instance, the first and second menu items 122, 124 are displayed in conjunction with content 126 on the display device 110. The first and second menu items correspond to a first level (e.g., a root level) of the hierarchical menu and represent a primary action and a control to navigate to another level of the hierarchical menu.

Responsive to receipt of an input to navigate to a second level of the hierarchical menu that is a sublevel of the first level, the second level is displayed in conjunction with the content on the display device, the content having a reduced display richness when displayed in conjunction with the second level than when displayed in conjunction with the first level (block 604). Continuing with the previous example, the second menu item "more" of the first stage 402 is selected to navigate to the second level of the hierarchical menu. As shown in the second stage 404, the content 126 is displayed to have a reduced display richness (darker in this example), which indicates "where" a currently displayed level of the hierarchy "fits in" to the hierarchy as a whole. For instance, in the system 400 of FIG. 4 successively darker displays of the content 126 indicate lower levels of the hierarchy. A variety of other examples are also contemplated.

Example Device

Figure 7:
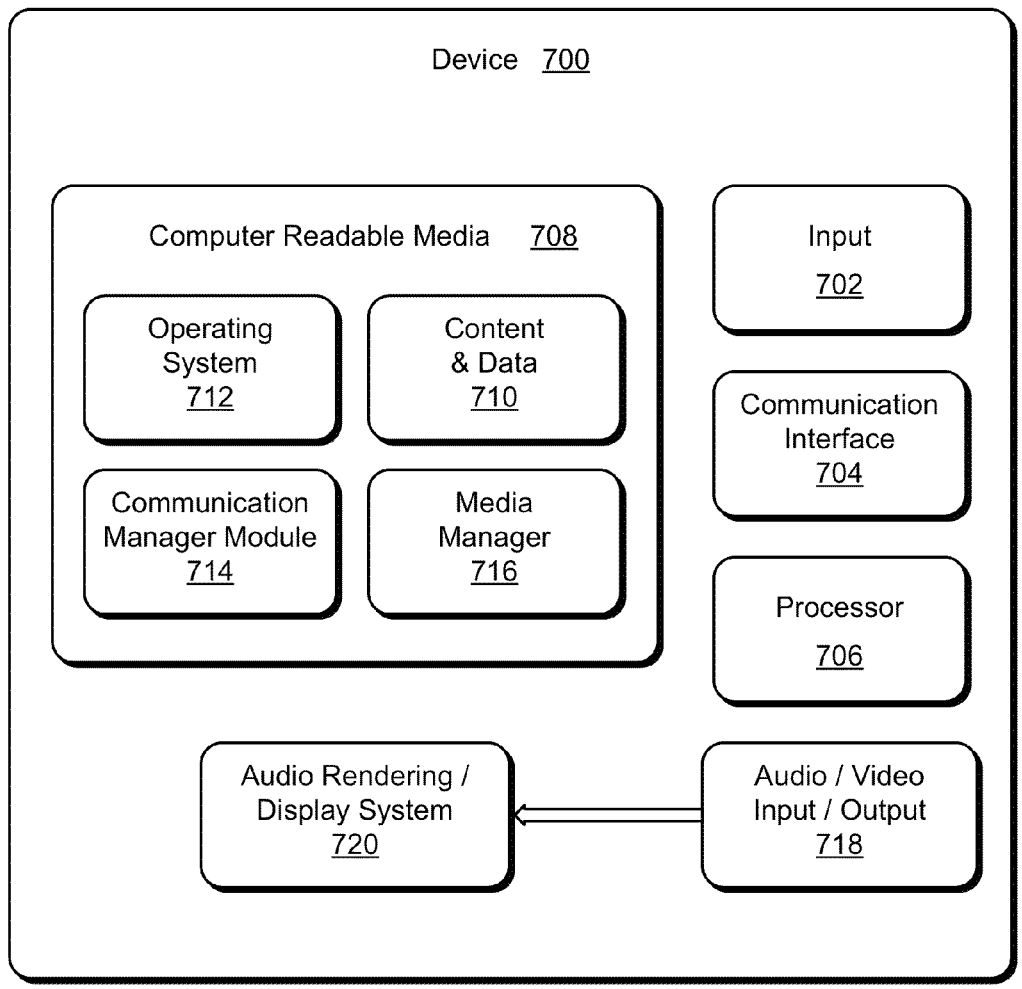
FIG. 7 illustrates various components of an example device that can be implemented in various embodiments as any type of a mobile device to implement embodiments of devices, features, and systems for mobile communications.

FIG. 7 illustrates various components of an example device 700 that can be implemented in various embodiments as any type of a mobile device to implement embodiments of devices, features, and systems for mobile communications. For example, device 700 can be implemented as any of the mobile communications devices 102 described with reference to respective FIGS. 1-5. Device 700 can also be implemented to access a network-based service, such as a social network service as previously described.

Device 700 includes input 702 that may include Internet Protocol (IP) inputs as well as other input devices, such as the keyboard 112 of FIG. 1. Device 700 further includes communication interface 704 that can be implemented as any one or more of a wireless interface, any type of network interface, and as any other type of communication interface. A network interface provides a connection between device 700 and a communication network by which other electronic and computing devices can communicate data with device 700. A wireless interface enables device 700 to operate as a mobile device for wireless communications.

Device 700 also includes one or more processors 706 (e.g., any of microprocessors, controllers, and the like) which process various computer-executable instructions to control the operation of device 700 and to communicate with other electronic devices. Device 700 can be implemented with computer-readable media 708, such as one or more memory components, examples of which include random access memory (RAM) and non-volatile memory (e.g., any one or more of a read-only memory (ROM), flash memory, EPROM, EEPROM, etc.).

Computer-readable media 708 provides data storage to store content and data 710, as well as device applications and any other types of information and/or data related to operational aspects of device 700. For example, an operating system 712 can be maintained as a computer application with the computer-readable media 708 and executed on processor 706. Device applications can also include a communication manager module 714 (which may be used to provide telephonic functionality) and a media manager 716.

Device 700 also includes an audio and/or video output 718 that provides audio and/or video data to an audio rendering and/or display system 720. The audio rendering and/or display system 720 can be implemented as integrated component(s) of the example device 700, and can include any components that process, display, and/or otherwise render audio, video, and image data. Device 700 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   displaying, in a user interface on a display device of the computing device, a first level of a plurality of levels of a hierarchical menu in conjunction with content other than any part of the hierarchical menu, the content displayed outside the display of the first level of the hierarchical menu;
   responsive to receipt of an input to navigate to a second level of the plurality of levels of the hierarchical menu that is a sublevel of the first level, displaying, in the user interface, the second level in conjunction with the content, the content displayed outside the display of the second level, the content that is not any part of the hierarchical menu having a reduced display richness when displayed in conjunction with the second level than when the content is displayed in conjunction with the first level; and
   responsive to receipt of an input to navigate to a third level of the plurality of levels of the hierarchical menu that is a sublevel of the second level, displaying, in the user interface, the third level in conjunction with the content, the content having a reduced display richness in comparison to the display richness of the content when it is displayed in conjunction with the second level, control of the display richness involving desaturation or darkening of the content and is indicative of a respective one of the plurality of levels of the hierarchical menu that is displayed in the user interface.

2. A method as described in claim 1, wherein one or more portions of the hierarchical menu represent actions that involve the content.

3. A method as described in claim 1, wherein the display of the hierarchical menu does not have the reduced display richness.

4. A method as described in claim 1, wherein the computing device is configured as a mobile communications device having telephone functionality and one or more levels of the hierarchical menu include representations of contacts.

5. A method as described in claim 1, wherein the computing device is configured to include an image capture device and the content is an image that was captured using the image capture device.

6. A method as described in claim 1, wherein the first level and the second level are displayed as an overlay over the content.

7. A method as described in claim 1, wherein the user interface does not include a toolbar.

8. A mobile communications device comprising:
   a display device;
   a processor; and
   memory configured to maintain an operating system that is executable on the processor to perform operations comprising:
   displaying, in a user interface on the display device, a first level of a plurality of levels of a hierarchical menu in conjunction with content other than any part of the hierarchical menu, the content displayed outside the display of the first level of the hierarchical menu;
   responsive to receipt of an input to navigate to a second level of the plurality of levels of the hierarchical menu that is a sublevel of the first level, displaying, in the user interface, the second level in conjunction with the content, the content displayed underlying the display of the second level, the content that is not any part of the hierarchical menu having a reduced display richness when displayed in conjunction with the second level than when the content is displayed in conjunction with the first level; and
   responsive to receipt of an input to navigate to a third level of the plurality of levels of the hierarchical menu that is a sublevel of the second level, displaying, in the user interface, the third level in conjunction with the content, the content having a reduced display richness in comparison to the display richness of the content when it is displayed in conjunction with the second level, control of the display richness involving desaturation or darkening of the content and is indicative of a respective one of the plurality of levels of the hierarchical menu that is displayed in the user interface.

9. A mobile communications device as described in claim 8, wherein one or more portions of the hierarchical menu represent actions that involve the content.

10. A mobile communications device as described in claim 8, wherein the display of the hierarchical menu does not have the reduced display richness.

11. A mobile communications device as described in claim 8, wherein the computing device is configured as a mobile communications device having telephone functionality and one or more levels of the hierarchical menu include representations of contacts.

12. A mobile communications device as described in claim 8, further comprising an image capture device and the content is an image that was captured using the image capture device.

13. A mobile communications device as described in claim 8, wherein the first and second levels are displayed as an overlay over the content.

14. A mobile communications device as described in claim 8, wherein the user interface does not include a toolbar.

15. A mobile communications device comprising:
   a touchscreen device;
   a processor; and
   memory configured to maintain an operating system that is executable on the processor to perform operations comprising:
   displaying, in a user interface on the touchscreen device, a first level of a plurality of levels of a hierarchical menu in conjunction with content other than any part of the hierarchical menu, the content displayed outside the display of the first level of the hierarchical menu;
   responsive to receipt of an input detected via the touchscreen device to navigate to a second level of the plurality of levels of the hierarchical menu that is a sublevel of the first level, displaying, in the user interface, the second level in conjunction with the content, the content displayed underlying the display of the second level, the content that is not any part of the hierarchical menu having a reduced display richness when displayed in conjunction with the second level than when the content is displayed in conjunction with the first level; and responsive to receipt of an input detected via the touchscreen device to navigate to a third level of the plurality of levels of the hierarchical menu that is a sublevel of the second level, displaying, in the user interface, the third level in conjunction with the content, the content having a reduced display richness in comparison to the display richness of the content when it is displayed in conjunction with the second level, control of the display richness involving desaturation or darkening of the content and is indicative of a respective one of the plurality of levels of the hierarchical menu that is displayed in the user interface.

16. A mobile communications device as described in claim 15, wherein one or more portions of the hierarchical menu represent actions that involve the content.

17. A mobile communications device as described in claim 15, wherein the display of the hierarchical menu does not have the reduced display richness.

18. A mobile communications device as described in claim 15, wherein the computing device is configured as a mobile communications device having telephone functionality and one or more levels of the hierarchical menu include representations of contacts.

19. A mobile communications device as described in claim 15, further comprising an image capture device and the content is an image that was captured using the image capture device.

20. A mobile communications device as described in claim 15, wherein the first and second levels are displayed as an overlay over the content.

\* \* \* \* \*